United States Patent
Abe et al.

(10) Patent No.: US 10,000,378 B2
(45) Date of Patent: Jun. 19, 2018

(54) CARBON MONOXIDE SHIFT REACTION APPARATUS AND CARBON MONOXIDE SHIFT CONVERSION METHOD

(71) Applicant: MITSUBISHI HEAVY INDUSTRIES, LTD., Tokyo (JP)

(72) Inventors: Hyota Abe, Tokyo (JP); Yoshio Seiki, Tokyo (JP); Akihiro Sawata, Tokyo (JP); Yukio Tanaka, Tokyo (JP); Masanao Yonemura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 14/768,909

(22) PCT Filed: Feb. 18, 2014

(86) PCT No.: PCT/JP2014/053718
§ 371 (c)(1),
(2) Date: Aug. 19, 2015

(87) PCT Pub. No.: WO2014/129440
PCT Pub. Date: Aug. 28, 2014

(65) Prior Publication Data
US 2016/0002032 A1    Jan. 7, 2016

(30) Foreign Application Priority Data
Feb. 21, 2013    (JP) ................ 2013-032109

(51) Int. Cl.
*C01B 3/38*    (2006.01)
*C01B 3/16*    (2006.01)
(Continued)

(52) U.S. Cl.
CPC ............. *C01B 3/16* (2013.01); *B01J 21/066* (2013.01); *B01J 23/882* (2013.01); *B01J 23/883* (2013.01);
(Continued)

(58) Field of Classification Search
CPC ....................................................... C01B 3/16
See application file for complete search history.

(56) References Cited

U.S. PATENT DOCUMENTS 3,128,163 A    4/1964    Weittenhiller et al.
3,850,841 A    11/1974   Aldridge et al.
(Continued)

FOREIGN PATENT DOCUMENTS

CN    101050390 A    10/2007
CN    101412932 A    4/2009
(Continued)

OTHER PUBLICATIONS

Specification of U.S. Appl. No. 61/664,415, filed Jun. 26, 2012.*
(Continued)

*Primary Examiner* — Paul A Wartalowicz
(74) *Attorney, Agent, or Firm* — Westerman, Hattori, Daniels & Adrian, LLP

(57) ABSTRACT

A carbon monoxide (CO) Shift reaction apparatus and a CO shift conversion method are capable of increasing the service life of a CO shift catalyst and reducing loss of energy. The CO shift reaction apparatus includes a plurality of CO shift reaction units in which a plurality of CO shift catalysts having mutually different active-temperature regions are arranged in a gas flow direction.

8 Claims, 3 Drawing Sheets

(51) Int. Cl.
*C10K 3/04* (2006.01)
*B01J 21/06* (2006.01)
*B01J 23/882* (2006.01)
*B01J 23/883* (2006.01)

(52) U.S. Cl.
CPC ........ *C10K 3/04* (2013.01); *C01B 2203/0283* (2013.01); *C01B 2203/0288* (2013.01); *C01B 2203/047* (2013.01); *C01B 2203/0883* (2013.01); *C01B 2203/1058* (2013.01); *Y02P 20/52* (2015.11)

(56) References Cited

U.S. PATENT DOCUMENTS

| | | | |
|---|---|---|---|
| 4,021,366 | A | 5/1977 | Robin et al. |
| 5,560,891 | A | 10/1996 | Takashima et al. |
| 6,019,954 | A | 2/2000 | Tang et al. |
| 6,403,049 | B1 | 6/2002 | Van Keulen et al. |
| 2002/0054837 | A1 | 5/2002 | Abe et al. |
| 2004/0229091 | A1* | 11/2004 | Rowe ................. B01D 53/02 48/198.3 |
| 2006/0233687 | A1* | 10/2006 | Hojlund Nielsen . B01D 53/508 423/210 |
| 2012/0027659 | A1 | 2/2012 | Yasutake et al. |
| 2012/0095119 | A1* | 4/2012 | Van Den Born .. B01D 53/1425 518/704 |
| 2012/0294789 | A1 | 11/2012 | Yasutake et al. |
| 2015/0299590 | A1* | 10/2015 | Keeler ................. C10K 3/008 252/373 |

FOREIGN PATENT DOCUMENTS

| | | | | |
|---|---|---|---|---|
| JP | | 39-13476 A | 7/1964 | |
| JP | | 58-134186 A | 8/1983 | |
| JP | | 58-134186 A | 10/1983 | |
| JP | | 7-112125 A | 5/1995 | |
| JP | | 2000-7302 A | 1/2000 | |
| JP | | 2001-517596 A | 10/2001 | |
| JP | | 2012-66237 A | 4/2012 | |
| JP | | 2012-131873 A | 7/2012 | |
| JP | | 2012-162425 A | 8/2012 | |
| WO | | 2010/116531 A1 | 10/2010 | |
| WO | WO 2010/112501 | * | 10/2010 | ............. B01D 53/14 |
| WO | | 2011/105501 A1 | 9/2011 | |
| WO | WO 2014/004646 | * | 1/2014 | ............... C10J 3/46 |

OTHER PUBLICATIONS

Search Report dated Jan. 18, 2016, issued in counterpart European Application No. 14754509.9-1370. (14 pages).
English translation of the International Preliminary Report on Patentability dated Sep. 3, 2015, issued in counterpart International Application No. PCT/JP2014/053718, w/ forms PCT/IB/373 and PCT/ISA/237 (6 pages).
International Search Report dated May 13, 2014, issued in counterpart Application No. PCT/JP2014/053718 (2 pages).
First Examination Report dated May 24, 2016, issued in counterpart Australian Application No. 2014219864. (5 pages).
Second Examination Report dated Dec. 1, 2016, issued in counterpart Australian Application No. 2014219864. pages).
Office Action dated Aug. 24, 2016, issued in counterpart Chinese Patent Application No. 201480020405.X, with English translation. (18 pages).
Office Action dated Jun. 17, 2016, issued in counterpart Japanese Patent Application No. 2013-032109, with English translation. (4 pages).
Notice of Allowance dated Sep. 16, 2016, issued in counterpart Japanese Patent Application No. 2013-032109, with English translation. (6 pages).

* cited by examiner

CARBON MONOXIDE SHIFT REACTION APPARATUS AND CARBON MONOXIDE SHIFT CONVERSION METHOD

TECHNICAL FIELD

The present invention relates to a carbon monoxide (CO) shift reaction apparatus and to a CO shift conversion method that converts CO contained in gasified gas into $CO_2$.

BACKGROUND ART

In recent years, coal gasification techniques and gas purification techniques have been developed to effectively use coal as an energy medium. On the other hand, in the process of purifying gas generated by gasifying coal (gasified gas), a CO shift reaction expressed by the following expression (I) for converting CO included in gasified gas into $CO_2$ is caused.

$$CO+H_2O \rightarrow CO_2+H_2 \quad (1)$$

In the CO shift reaction, a catalyst (a CO shift catalyst) is used to promote the reaction. However, because CO shift reactions are exothermal, the temperature in the shift reactor may increase to approximately 400° C. the durability of the CO shift catalyst may be reduced.

As measures for preventing the reduction in the durability of such a CO shift catalyst, the techniques disclosed in Patent Literatures 1 and 2 are known.

CITATION LIST

Patent Literature

[Patent Literature 1] Japanese Unexamined Patent Application Publication No. 2017-162425
[Patent Literature 2] Japanese Unexamined Patent Application Publication No. 2012-131873

SUMMARY OF INVENTION

Technical Problem

The present invention has been devised in consideration of the above-described circumstances, and an object of the present invention is to provide a CO shift reaction apparatus and a CO shift conversion method capable of increasing the service life of a CO shift catalyst and reducing loss of energy.

Solution to Problem

To solve the above-described problem, according to an aspect of the present invention, a CO shift reaction apparatus includes a CO shift reaction unit including a plurality of CO shift catalysts with mutually different active-temperature regions arranged in a gas flow direction. It is preferable that a Ni—Mo catalyst having a first temperature region be arranged in a upstream portion of the CO shift reaction unit as the CO shift catalyst and that a highly durable CO shift catalyst having a second temperature region be arranged in a downstream portion of the CO shift reaction unit as the CO shift catalyst. In a preferable embodiment, a plurality of the CO shift reaction units ma be serially arranged. A line for circulating unreacted gas may be provided between the CO shift reaction units. A heat exchanger that cools gas after a shift reaction in the CO shift reaction unit to a temperature in the first temperature region may be further provided. It is preferable that the Ni—Mo catalyst include an active component including molybdenum (Mo) as a main component and nickel (Ni) as an accessory component and be carried by one or two or more of titanium (Ti), zirconium (Zr). and cerium (Ce) that carry the active component. It is preferable that the CO Shift catalyst that is highly durable in high-temperature regions be a Co—Mo catalyst. It is preferable that the CO shift catalyst that is highly durable in low-temperature regions be a Ni—Mo catalyst. Furthermore, it is preferable that the first temperature region be a range of 150 to 300° C. and the second temperature region be a range of 300 to 500° C.

According to another aspect of the present invention, the present invention is a CO shift conversion method that is a CO shift conversion method of converting CO contained in gasified gas obtained by gasifying coal (gasified gas) into $CO_2$ which includes a step of brining the gasified gas into contact with a plurality of CO shift catalysts that are highly durable and haying mutually different temperature regions arranged in a gas flow direction. The contacting step may include bringing the gasified gas into contact with a highly durable CO shift catalyst having a second temperature region after bringing the gasified gas into contact with a Ni—Mo catalyst having a first temperature region. The CO shift conversion method may further include a step of bringing the gasified gas having contacted the highly durable CO shift catalyst into contact with the Ni—Mo catalyst again. In addition, the CO shift conversion method may further include a step of cooling the gasified gas having contacted the highly durable CO shift catalyst to a temperature in the first temperature region.

Advantageous Effects of Invention

According to the CO shift reaction apparatus and the CO shift conversion method of the present invention, the service life of the CO shift conversion method can he increased and loss of energy can he reduced.

DESCRIPTION OF EMBODIMENTS

Figure 1:
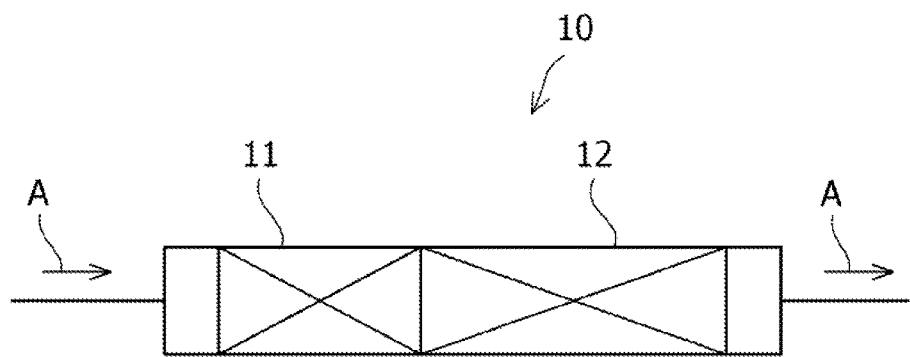
FIG. 1 is a schematic diagram which illustrates an embodiment of the CO shift reaction apparatus according to the present invention.

Embodiments of the CO shift reaction apparatus and the CO shift conversion method according to the present invention will be described below with reference to attached drawings; however, the present invention is not limited to the following embodiments. FIG. 1 illustrates an embodiment of the CO shift reaction apparatus according to the present invention.

A CO shift reaction apparatus 10 according to the present embodiment includes a CO shift reaction unit including a plurality of CO shift catalysts with mutually different active-temperature regions arranged in a gas flow direction A. A Ni—Mo catalyst having a first temperature region is arranged in an upstream portion 11 of the CO shift reaction unit and a highly durable CO shift catalyst having a second temperature region is arranged in a downstream portion 12 of the CO shift reaction unit, respectively as a CO shill catalyst.

Figure 3:
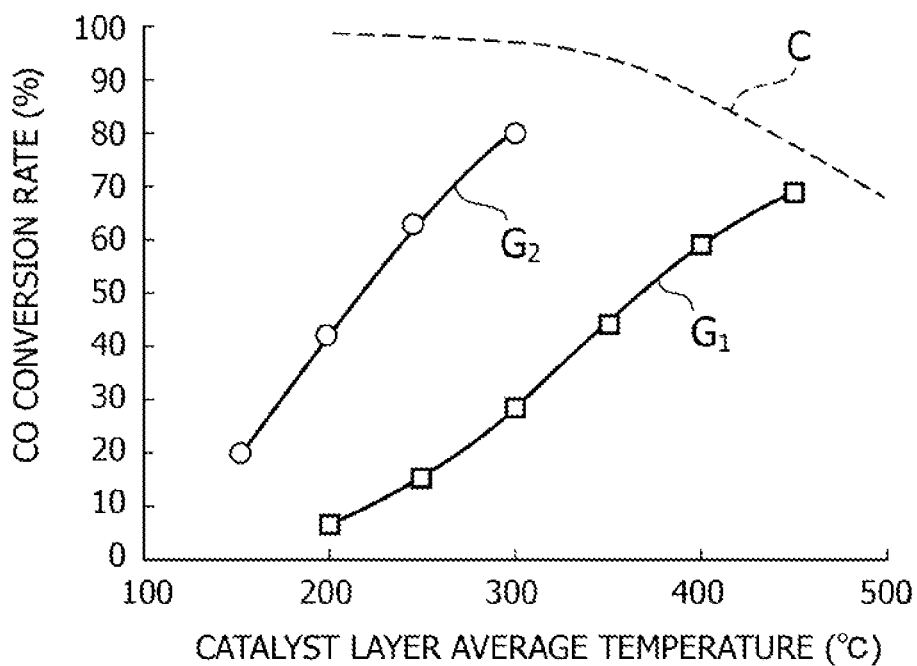
FIG. 3 is a graph which illustrates a relationship between catalyst layer temperatures of a Co—Mo catalyst and a IN catalyst and a CO conversion rate.

For the CO shill catalyst, a Co—Mo catalyst or a Ni—Mo catalyst is generally used. The inventors have industriously examined the relationship between the temperature of these catalyst layers and the CO conversion rate. FIG. 3 shows the results. The term "CO conversion rate" herein refers to the rate of conversion of CO into CO. As shown in FIG. 3, it has been found that with respect to the Co—Mo catalyst (graph $G_I$ of unfilled squares), the activity in the high-temperature region (300 to 500° C.) (i.e., the CO conversion rate is 40% or higher) but the activity in the low-temperature region (150 to 300° C.) is low. On the other hand, it has been found that with respect to the Ni—Mo catalyst (graph $G_2$ of unfilled circles in FIG. 3), the activity in the high-temperature region is low but the activity in the low-temperature region is high. Referring to the equilibrium conversion rate curve C, because CO shift reactions are an exothermal reaction, as described above, low temperatures are more advantageous in terms of chemical equilibrium, and the equilibrium conversion rate is considered to be higher in low temperatures.

Figure 4:
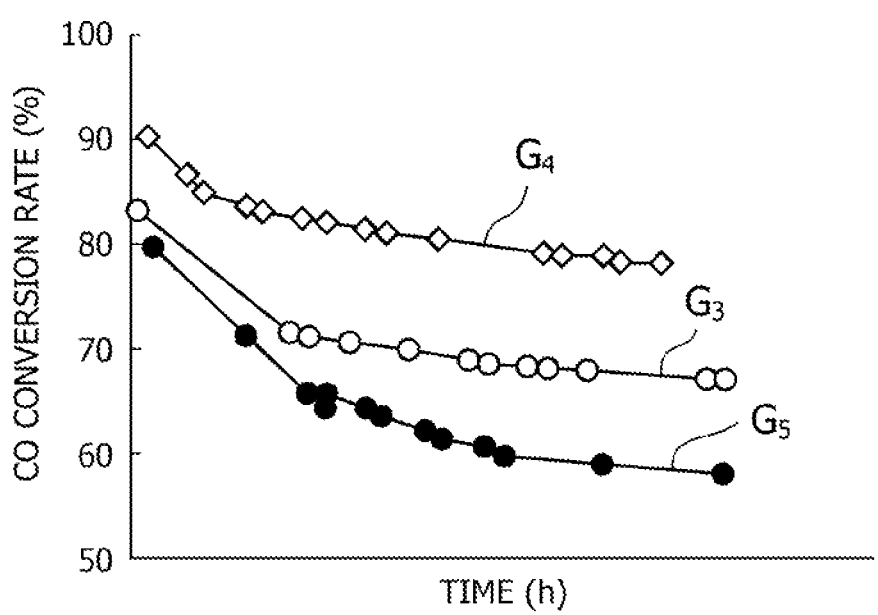
FIG. 4 is a graph which illustrates a relationship between durability time at catalyst layer temperatures of the Ni—Mo catalyst and the CO conversion rate.

The inventors have also industriously examined the high-temperature durability of the Ni—Mo catalyst having a high activity in low-temperature regions. FIG. 4 shows the results. As shown in FIG. 4, it has been found that the durability is higher in the low-temperature regions in which the catalyst layer average temperature is 250° c. (graph $G_3$ r of filled circles in FIG. 4) or 300° C. (graph $G_4$ of unfilled diamonds in FIG. 4) than in the high-temperature regions in which the catalyst layer average temperature is 450° c. (graph ($1_5$ of filled circles in FIG. 4). Based on this finding, it is considered that Ni—Mo catalysts are suitable for long-term use in low-temperature regions.

Figure 5:
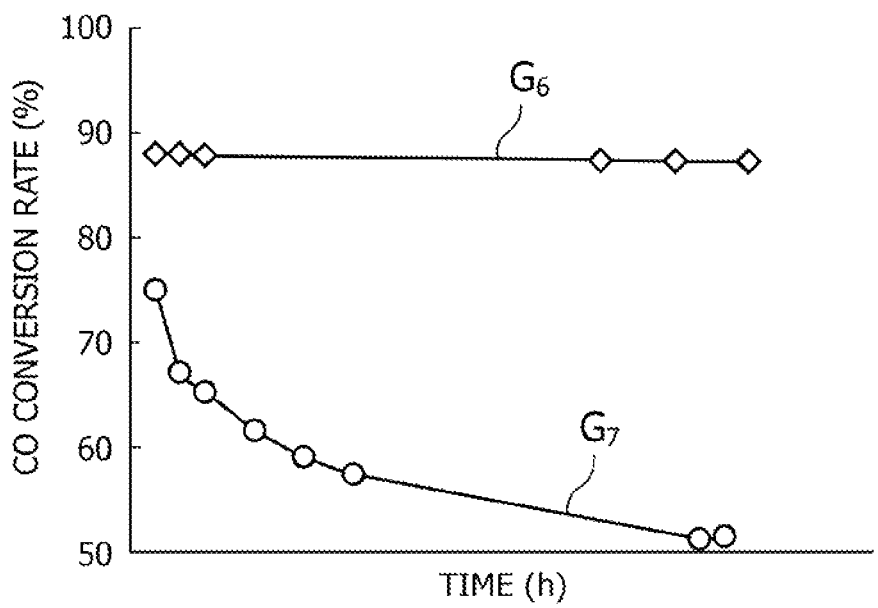
FIG. 5 is a graph which illustrates a relationship between durability time at catalyst layer temperatures of the Co—Mo catalyst and the CO conversion rate.

Furthermore, the inventors have industriously examined the high-temperature durability of the Co—Mo catalyst having a high activity in high-temperature regions. FIG. 5 shows the results. As shown in FIG. 5, it has been found that the durability is higher in the high-temperature regions in which the catalyst layer average temperature is 350° C. (graph $G_6$ of unfilled diamonds in FIG. 5) or 300° C. (graph $G_7$ of unfilled circles in FIG. 5) than in the low-temperature regions in which the catalyst layer average temperature is 250° c. (graph $G_7$ of filled circles in FIG. 4). Based on this finding, it is considered that Co—Mo catalysts are suitable for long-term use in high-temperature regions.

Subsequently, in the present embodiment, the first temperature region is a temperature range of 150 to 300° C. and the second temperature region is a temperature range of 300 to 500° C.

The Ni—Mo catalyst includes an active component including molybdenum (Mo) as a main component and nickel (Ni) as an accessory component and is carried by one or two or more of titanium (Ti), zirconium (Zr), and cerium (Ce) that carry the active component. A catalyst with an excellent low-temperature activity can be provided by using any one of titanium (Ti), zirconium (Zr), and cerium (Ce) as the carrier, which thereby enables effective progress of CO shift reactions.

For the carrier, it is preferable to use oxides such as $TiO_2$, $ZrO_2$, and $CeO_2$. The carrier may include a complex oxide in Which at least two of them or at least elements of least two of them are present. Examples of such a complex oxide includes $TiO_2$-$ZrO_2$, $TiO_2$-$CeO_2$, $CeO_2$-$ZrO_2$, and the like.

The carried amount of molybdenum (Mo) that is the main component is preferably 0.1 to 25% by weight, more preferably 5 to 22% by weight. The carried amount of nickel (Ni) that is the accessory component is preferably 0.01 to 10% by weight, more preferably 3 to 10% by weight.

For a highly durable CO shift catalyst, Co—Mo catalysts can be used. For the Co—Mo catalyst, a catalyst in which 3 to 5% CoO and 10 to 15% $MoO_3$ are carried by $Al_2O_3$, MoO, and the like can be used.

According to the apparatus having the configuration described in the present embodiment, first, low-temperature (about 200° C.) gasified gas is supplied to the CO shift reaction unit, and the gasified gas is brought into contact with the Ni—Mo catalyst having been charged in the upstream portion 11 to promote the CO shift reaction. Next, the gasified gas of which the temperature has increased to a high temperature as the reaction progresses is brought into contact with the CO shift catalyst having been charged in the downstream portion 12 to further promote the CO shift catalyst.

Figure 6:
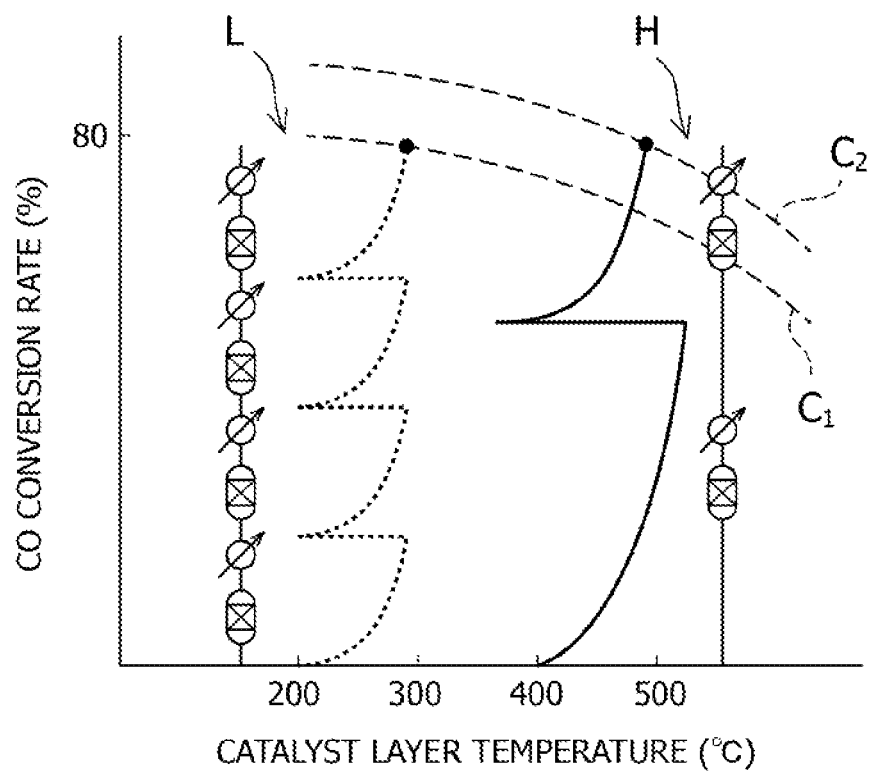
FIG. 6 is a schematic diagram which illustrates a relationship between the CO conversion rate of a case in which the Ni—Mo catalyst is used, and that of a case in which the Co—Mo catalyst is used, and the number of stages of a reactor.

The inventors have industriously examined the relationship between the CO conversion rate and the number of stages of the reactor when the Ni—Mo catalyst and the Co—Mo catalyst are used. FIG. 6 shows the results. Note that in FIG. 6, a curve $C_1$ indicated with a broken line is an equilibrium conversion rate curve for steam/CO concentration=1.0, and a curve $C_2$ indicated with a broken line is an equilibrium conversion rate curve for steam/CO concentration=2.0. As shown in FIG. 6, it has been found that when a Ni—Mo catalyst with a high durability in low-temperature regions (i.e., the low-temperature side L in FIG. 6) is used, a high CO conversion rate can be achieved by using at least four stages for the reactor. It has also been found that when a Co—Mo catalyst with a high durability in high-temperature regions (i.e., the high-temperature side H in FIG. 6) is used, a high CO conversion rate can be achieved by using at least two stages for the reactor. If the Ni—Mo catalyst is used, a higher equilibrium conversion rate can be obtained compared with the case of using the Co—Mo catalyst although the number of stages of the reactor is greater. Specifically, to increase the rate of conversion of CO into $CO_2$ by running CO shift reactions, the number of stages of the reactor may be changed at a point at which the chemical equilibrium is reached and the temperature inside the reactor may be lowered by using a cooler to prevent catalyst deactivation that may occur due to rise in the temperature inside the shift reactor. However, if the number of reactors necessary for increasing the CO conversion rate increases, the initial costs and the miming costs may increase, which is not practical for use in actual plants. In addition, as a measure for preventing catalyst deactivation, an isothermal reactor may be used however, in this case, the structure of the reactor may become complex because a tube in which the coolant is circulated is arranged inside the reactor, which may increase the costs.

In contrast, according to the apparatus configuration of the present invention, CO shift reactions can be carried out in a wide temperature range and by using one stage of a CO shift reaction unit. Accordingly, as is clear from the descriptions of the present embodiment, according to the present invention, it is not necessary to change the number of stages of the reactor at a point at which the chemical equilibrium is reached and the temperature inside the reactor may be reduced by using a cooler to prevent catalyst deactivation that may occur due to rise in the temperature inside the shift reactor.

Note that the temperature inside the CO shift reaction unit can be controlled by adjusting the flow of the gas (the CO concentration) and the amount of the steam to be supplied to the CO shift reaction unit. The ratio between the amount of steam and the CO concentration (steam/CO) is preferably 1.0 to 2.0, more preferably 1.0.

As described above, according to the CO shift reaction apparatus and the CO shift conversion method of the present embodiment, degradation of the Ni—Mo catalyst and the highly durable CO shift catalyst can be reduced, and thereby, the service life of the CO shift catalyst can be increased. In addition, because the CO shift reactions can be carried out by using a one-stage CO shift reaction unit, the number of the reactors can be reduced and the cooler can be omitted, and as a result, loss of energy can be reduced.

Figure 2:
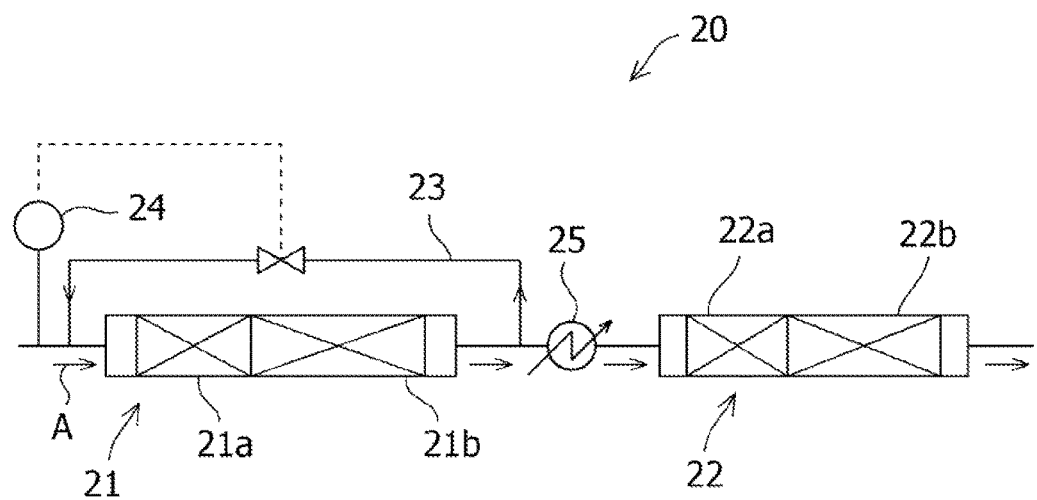
FIG. 2 is a schematic diagram which illustrates another embodiment of the CO shift reaction apparatus according to the present invention.

Next, another embodiment of the CO shift reaction apparatus according to the present invention will be described with reference to FIG. 2. FIG. 2 illustrates another embodiment of the CO shift reaction apparatus according to the present invention. In the example illustrated in FIG. 2, there are two stages in the CO shift reaction unit; however, the CO shift reaction unit may include three or more stages when necessary.

The CO shift reaction apparatus 20 according to the present embodiment includes a CO shift reaction unit including a plurality of CO shift catalysts with mutually different temperature regions arranged in a gas flow direction A. The CO shift reaction unit includes a first CO shift reaction unit 21 arranged on the upstream side of the gas flow direction A and a second CO shift reaction unit 22 arranged on the downstream side of the gas flow direction A. A Ni—Mo catalyst having the first temperature region is arranged in an upstream portion 21a of the first CO shift reaction unit 21, and a highly durable CO shift catalyst having the second temperature region is arranged in a downstream portion 21b of the first CO shift reaction unit 21. Similarly, a Ni—Mo catalyst having the first temperature region is arranged in an upstream portion 22a. of the second CO shift reaction unit 22, and a highly durable CO shift catalyst having the second temperature region is arranged in a downstream portion 22b of the second CO shift reaction unit 22.

A circulation line 23 for returning an unreacted portion (CO) of the gasified gas supplied to the first CO shift reaction unit 21 from an outlet of the first CO shift reaction unit 21 to its inlet is provided in the first CO shift reaction unit 21. A densitometer 24 for measuring the concentration of CO contained in the gasified gas is arranged on the upstream side of the first CO shift reaction unit 21. The densitometer 24 is not particularly limited, and a gas chromatograph can be used, for example.

Between the first CO shift reaction unit 21 and the second CO shift reaction unit 22, a heat exchanger 25 for cooling the gas after the shift reaction in the first CO shift reaction unit 21 to a temperature in the first temperature region is provided. Although not illustrated in the drawing, a steam supply line for supplying steam is provided between the first CO shift reaction unit 21 and the second CO shift reaction unit 22.

According to the apparatus having the configuration described above, first, low-temperature (about 200° C.) gasified gas is supplied to the first CO shift reaction unit 21, and the gasified gas is brought into contact with the Ni—Mo catalyst having been charged in the upstream portion 21a of the first CO shift reaction unit 21 to promote the CO shift reaction. Subsequently, the gasified gas of which the temperature has increased to a high temperature as the reaction progresses is brought into contact with the highly durable CO shift catalyst haying been charged in the downstream portion 21b of the first CO shift reaction unit 21 to further promote the CO shift catalyst.

If the CO concentration measured by the densitometer 24 arranged on the upstream side of the first CO shift reaction unit 21 is higher than a predetermined concentration, the gasified gas having contacted the CO shift catalyst in the first CO shift reaction unit 21 is returned to the inlet of the first CO shift reaction unit 21 through the circulation line 23, then the gasified gas is brought into contact with the Ni—Mo catalyst again, and thereby the CO shift reaction can be promoted. This is because, in some cases, unreacted gas may still be included in the gasified gas due to insufficient progress of the CO shift reaction. The CO conversion rate can be increased more by the above-described process. The CO concentration is preferably 20 to 70%, more preferably 30 to 65%. By providing the circulation line 23, the composition and the flow of the gas at the inlet of the second CO shift reaction unit 22 can be stabilized.

The gas after the shift reaction haying contacted the CO shift catalyst in the first CO shift reaction unit 21 is cooled by the heat exchanger 25 down to the temperature in the first temperature region. Degradation of the durability of the Ni—Mo catalyst charged in the upstream portion 22a of the second CO shift reaction unit 22 can be thereby prevented. The cooled gas is brought into contact with the Ni—Mo catalyst charged in the upstream portion 22a, of the second CO shift reaction unit 22 to promote the CO shift reaction. Subsequently the gas, of which the temperature has increased to a high temperature as the reaction progresses, is brought into contact with the highly durable CO shift catalyst having been charged in the downstream portion 22b of the second CO shift reaction unit 22 to further promote the CO shift catalyst. By serially arranging the plurality of CO shift reaction units in the above-described manner, the CO conversion rate can be further increased.

Note that by supplying steam to the gas after the shift reaction having contacted the CO shift catalyst in the first CO shift reaction unit 21 by using the steam supply line provided between the first CO shift reaction unit 21 and the second CO shift reaction unit 22, the amount of the steam can be controlled to an amount appropriate for the second CO shift reaction unit 22, and thereby the CO shift reaction can be effectively run.

As described above, according to the CO shift reaction apparatus and the CO shift conversion method according to the present embodiment, degradation of the Ni—Mo catalyst and the highly durable CO shift catalyst can be suppressed, and thereby the life of the CO shift catalyst can be increased. In addition, compared with the prior art, the number of the reactors can be reduced and the cooler can be omitted, and thereby loss of energy can be reduced.

The CO shift reaction apparatus and the CO shift conversion method according to the present invention gasified gas can be used in a gasified gas purification system for obtaining purified gas by purifying gas obtained by gasifying gas (gasified gas). The gasified gas purification system includes a gasification furnace that gasifies coal, a filter that eliminates dust contained in the gasified gas, a CO shift reaction apparatus that produces purified gas by converting CO included in the gasified gas into $CO_2$, and an absorption column that absorbs and eliminates $CO_2$ and $H2_S$ included in the gasified gas. According to the gasified gas purification system described above, purified gas can be effectively produced.

EXAMPLES

The present invention will be described below with reference to Examples and the like; however, the present invention is not limited thereto.

Example 1

A CO shift reaction was rim by using the CO shift reaction apparatus according to the present invention. Specifically a Ni—Mo catalyst was charged in the upstream portion of the CO shift reaction unit and a Co—Mo catalyst was charged in the downstream portion of the CO shift reaction unit, and gasified gas was supplied from the upstream portion of the CO shift reaction unit. The evaluation was performed by calculating a conversion rate of CO included in the gasified gas into $CO_2$ (CO conversion) The CO conversion rate was 83%.

Comparative Example 1

A CO shift reaction was performed by using a CO shift reaction apparatus provided with two stages of the CO shift reaction units including a CO shift reactor and a cooler. A Co—Mo catalyst was charged into the CO shift reaction unit. The evaluation was performed in a manner similar to that in Example 1. The CO conversion rate was 78%.

In view of Example 1 and Comparative Example 1, it was shown that the CO shift reaction apparatus according to the present invention was capable of running the CO shift reaction more effectively than the comparative CO shift reaction apparatus.

Reference Signs List

10, 20: CO shift, reaction apparatus; 11: Upstream portion of the CO shift reaction unit; 12: Downstream portion of the CO shift reaction unit; 21: First CD shift reaction unit; 21a: Upstream portion of the first CO shift reaction unit; 21b: Downstream portion of the first CO shill reaction unit; 22: Second CO shift reaction unit; 22a: Upstream portion of the second CO shift reaction unit; 22b: Downstream portion of the second CO shift reaction unit; 23: Circulation line; 24: Densitometer: 25: Heat exchanger: A: Gas stream direction; C, $C_1$, $C_2$: Equilibrium conversion curve; $G_1$, $G_2$, $G_3$, $G_4$, $G_5$, $G_6$, $G_7$: Graphs; H: High temperature side; and L: Low temperature side

The invention claimed is:

1. A CO shift reaction apparatus comprising a CO shift reaction unit including a plurality of CO shift catalysts with mutually different active-temperature regions arranged in a gas flow direction,
   wherein the CO shift reaction unit is a CO shift reactor of one stage having a Ni—Mo catalyst and a Co—Mo catalyst, and
   wherein the Ni—Mo catalyst is arranged in an upstream portion of the CO shift reaction unit as the CO shift catalyst and the Co—Mo catalyst is arranged in a downstream portion of the CO shift reaction unit as the CO shift catalyst.

2. The CO shift reaction apparatus according to claim 1, wherein a plurality of the CO shift reaction units is serially arranged.

3. The CO shift reaction apparatus according to claim 2, further comprising a heat exchanger configured to cool gas after a shift reaction in the CO shift reaction unit to a temperature within a range of 150 to 300° C.

4. The CO shift reaction apparatus according to claim 3, further comprising a second CO shift reaction unit arranged in an upstream of the heat exchanger,
   wherein the second CO shift reaction unit is a CO shift reactor of one stage having a Ni—Mo catalyst and a Co—Mo catalyst, and
   wherein the Ni—Mo catalyst is arranged in an upstream portion of the second CO shift reaction unit and the Co—Mo catalyst is arranged in a downstream portion of the second CO shift reaction unit.

5. The CO shift reaction apparatus according to claim 2, wherein the Ni—Mo catalyst includes molybdenum (Mo) and nickel (Ni) which are carried by one or more of titanium (Ti), zirconium (Zr), and cerium (Ce).

6. The CO shift reaction apparatus according to claim 5, wherein the Co—Mo catalyst includes CoO and $MoO_3$ carried by $Al_2O_3$ or MoO.

7. The CO shift reaction apparatus according to claim 2 further comprising a line for circulating unreacted gas provided between the CO shift reaction units.

8. The CO shift reaction apparatus according to claim 2, wherein the CO shift reaction unit is configured to control the temperature of the upstream portion of the unit within a range of 150 to 300° C. and is configured to control the temperature of the downstream portion of the unit within a range of 300 to 500° C.

* * * * *